United States Patent [19]

Malyshev et al.

[11] 4,304,393

[45] Dec. 8, 1981

[54] GATE VALVE TO SHUT OFF FLOW OF LIQUID IN PIPELINES

[76] Inventors: Vladimir N. Malyshev, ulitsa 25 let Oktyabrya, 4, kv. 22; Oleg G. Reinik, ulitsa Ordzhonikidze, 50, kv. 57; Petr I. Jurin, ulitsa Chernomorskaya, 2, kv. 12; Gennady A. Yarushnikov, ulitsa Tsiolkovskogo, 67, kv. 27; Grigory T. Tjutikov, ulitsa Tsiolkovskogo, 67, kv. 42, all of Novokuznetsk Kemerovskoi oblasti; Jury N. Chernovsky, ulitsa Komsomolskaya, 22, kv. 93, Kaltan Kemerovskoi oblasti, all of U.S.S.R.

[21] Appl. No.: 125,902

[22] Filed: Feb. 29, 1980

Related U.S. Application Data

[63] Continuation of Ser. No. 878,413, Feb. 16, 1978.

[51] Int. Cl.³ .............................................. F16K 3/34
[52] U.S. Cl. ................................. 251/210; 251/327
[58] Field of Search ........................ 137/625.33, 546; 251/327, 210, 326

[56] References Cited

U.S. PATENT DOCUMENTS

| | | | |
|---|---|---|---|
| 1,886,139 | 11/1932 | Wells | 251/210 |
| 2,253,888 | 8/1941 | Carlson | 137/546 |
| 3,170,670 | 2/1965 | Johnstone | 251/326 X |
| 3,463,446 | 8/1969 | Natho | 251/327 X |
| 3,780,982 | 12/1973 | Kemp | 137/625.33 X |

FOREIGN PATENT DOCUMENTS 877077  5/1953  Fed. Rep. of Germany ...... 251/327

Primary Examiner—Arnold Rosenthal
Attorney, Agent, or Firm—Robert E. Burns; Emmanuel J. Lobato; Bruce L. Adams

[57] ABSTRACT

The gate valve has a housing hermetically joined with pipelines and a closing member which is translationally traversable in between the sealing elements of the housing. A bottom end of the closing member having a bevelled edge made so that at the instance when the pipelines get intercommunicated, the passageway is established in between the abovesaid bevelled edge, the housing and the sealing elements, said passageway growing narrow towards the direction of the flow of liquid. The above feature makes it possible to rule out the onset of conditions fraught with cavitation under the closing member and bring the cavitation outside the closing member, thereby adding to the service life of the gate valve.

4 Claims, 3 Drawing Figures

GATE VALVE TO SHUT OFF FLOW OF LIQUID IN PIPELINES

This is a continuation, of application Ser. No. 878,413, filed Feb. 16, 1978.

BACKGROUND OF THE INVENTION

The present invention relates generally to pipeline fittings and has particular reference to gate valves adapted to shut off the flow of liquid in pipelines, made use of in diverse fields of industry, such as mining, construction, chemical, petroleum production, and the like.

The invention can find most utility when applied for pipelines laid in underground coal winning by the hydraulic method.

A large number of diverse types of gate valves are known for use currently which comprise substantially a housing hermetically joined with pipelines, and a closing member translationally traversable in between the sealing elements of the housing.

However, despite a great diversity of gate valves now in use the problem how to prolong their service life is yet far from being completely solved, especially when the gate valves are used to shut off the flow of liquids containing solid impurities, as the closing members and their sealing elements are liable to destruct within a short period of time. This is due largely to the fact that when the pipelines are shut off or intercommunicated, adverse conditions for the closing members and sealing elements arise, consisting in that a passageway is established when the pipelines are communicated to each other or shut off, said passageway being confined within the bottom end of the closing member, the gate valve housing and the sealing elements and featuring the same cross-sectional area at the entrance and exit thereof. We have been successful in finding out that the flow of liquid along such a passageway defines a void space situated beneath the closing member close to the entrance to the passageway, said void space considerably choking the free passage area and, consequently, reducing the hydrodynamic pressure in the flow, thus providing the conditions for the onset of cavitation. Before leaving the passageway the flow of liquid expands, the hydrodynamic pressure rises and the cavities are broken, all this leading to rapid failure of both the closing member and the sealing elements.

SUMMARY OF THE INVENTION

It is an essential object of the present invention to provide a gate valve, wherein favourable conditions would be established for operation of its closing member and for longer service life thereof.

It is another object of the present invention to reduce the mass and overall size of the gate valve.

In keeping with said and other objects in a gate valve to shut off the flow of liquid in pipelines, comprising a housing hermetically joined with pipelines and having sealing elements between which is interposed a closing member translationally traversable normal to the direction of the flow of liquid, according to the invention the closing member has a bevelled edge at its bottom end throughout the entire length thereof, said bevelled edge being so made that, at the instance when communication is established between the pipelines, a passageway is defined between the bevelled edge of the closing member, the housing of the gate valve and the sealing elements, said passageway growing narrow towards the direction of the flow of liquid along the pipelines.

Such a constructional arrangement of the closing device makes it possible to gradually compress the flow of liquid thereunder towards the direction of its passing and thereby rule out the onset of conditions fraught with cavitation and bring the latter outside the closing member towards the direction of the flow of liquid. As a result, favourable conditions are provided for operation of the closing member and sealing elements, whereby the gate valve service life is many times extended. Furthermore, this renders it possible to reduce the mass of the closing member and of the actuator imparting translational motion thereto.

In what follows the invention is characterized in that provision is made on the end of the closing member for a projection located on the side of the bevelled edge thereof and adapted, when in either of its extreme positions, to contact with the sealing element which is situated in the housing at the end of the liquid flow. This is instrumental in keeping the sealing elements against being dislodged by the flow of liquid and doing away with their being fixed rigidly in position in the valve housing, a feature that simplifies much the gate valve construction.

It is expedient that the sealing elements be so fitted in the housing as to be forced against the closing member through the agency of elastic rings interposed between the housing and the sealling element, whereby a required contact pressure is developed at the place of sealing in cases where the pressure of the flow of liquid is below normal. In addition, such an arrangement of the sealing elements provides for a complete hermetic tightness when shutting off the pipelines even in case of foreign object penetration in between the sealing element and the closing member.

Thus, the gave valve proposed herein is simple in construction, reliable in operation and features long service life.

BRIEF DESCRIPTION OF THE DRAWINGS

In what follows the present invention is illustrated in a detailed disclosure of a specific embodiment of the gate valve to shut off the flow of liquid in pipelines substantially as represented in the accompanying drawings, wherein.

DESCRIPTION OF THE PREFERRED EMBODIMENTS

Figure 1:
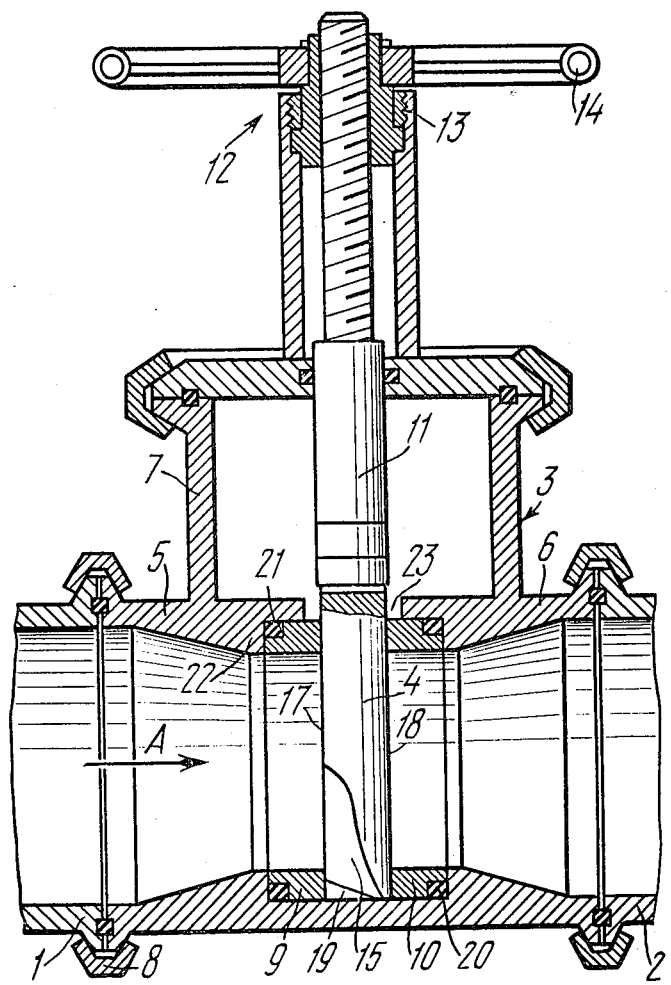
FIG. 1 is a general view, partly in longitudinal section, of a gate valve, according to the invention.

Now referring to the accompanying drawings, the gate valve to shut off the flow of liquid is built in to pipelines 1 and 2 (FIG. 1) and comprises a housing 3 and a closing member or gate 4.

The housing 3 is made as a three-way fitting composed of branches 5, 6 and 7, the diameters of the branches 5 and 6 approximating those of the pipes 1 and 2, respectively. The branches 5 and 6 of the housing are communicated with the pipelines 1 and 2 through a quick-to-release coupling 8 of any heretofore known construction providing for a hermetically sealed joint.

The housing 3 accommodates annular sealing elements 9 and 10 between which the closing member 4 is interposed with a possibility of translationally traversing normal to the direction of the flow of liquid. The closing member 4 is made as a slide gate, though it may also be made as one-piece structure or be composed of a number of oblong components (not shown in FIGS. 1 through 3).

The closing member 4 with its top end is connected (by any of the heretofore known means) to a telescopic rod 11 of an actuator 12 in whose capacity use may be made of any hitherto known driving means suitable for imparting translational motion to the closing member; the actuator consists of a nut 13 and a handwheel 14 in the given particular case.

Figures 2, 3:
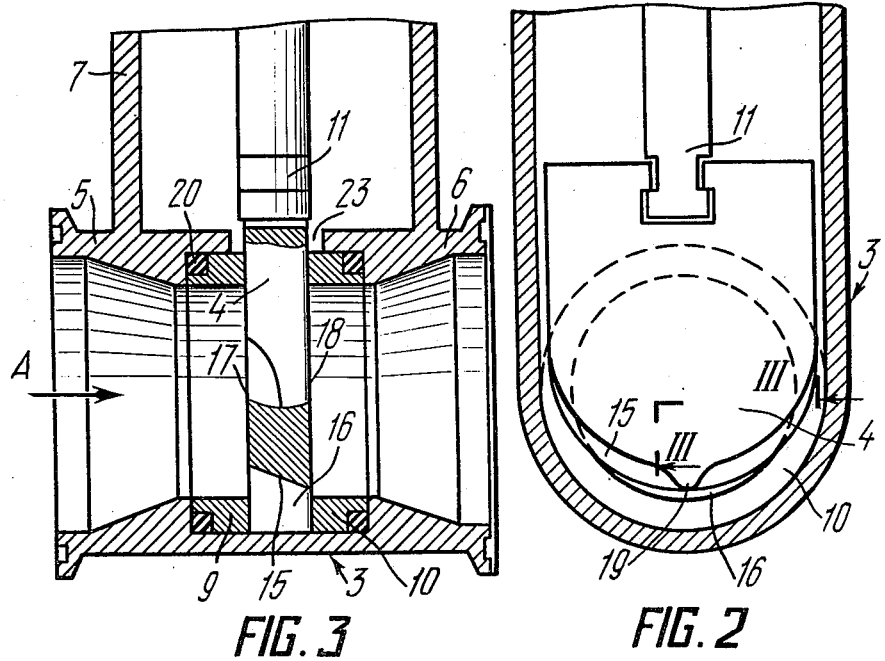
FIG. 2 is a front view showing the position of the closing member at the instance where communication is established between the pipelines as seen along the direction of the flow of liquid.
FIG. 3 is a section view taken along section line III—III in FIG. 1.

A bevelled edge 15 is provided on the bottom end of the closing member 4 throughout its entire width as it is shown in FIGS. 2 and 3; the abovesaid bevelled edge is so made that when the pipeline 1 gets communicated with the pipeline 2, a passageway 16 is established between the bevelled edge 15 of the closing member bottom end, the sealing elements 9 and 10 and the housing 3, said passageway growing narrow towards the direction of the flow of liquid as indicated by the arrowhead A in FIGS. 1 and 3. It is due to the provision of said bevelled edge 15 that a lateral surface 17 of the closing member 4 facing the direction of the flow of liquid is of shorter length than an opposite lateral surface 18 thereof.

Such a tapered shape of the passageway 16 is retained throughout the entire period of translational motion of the closing member as the pipelines 1 and 2 are either communicated or shut off; in addition the flow area of said passageway 16 at is entrance exceeds that at the exit thereof.

A projection 19 (FIGS. 1 and 2) is provided on the end of the closing member 4 on the side of its bevelled edge 15, said projection being adapted to contact the sealing element 9 located in the housing on the side facing the direction of the flow of liquid, with the closing member 4 assuming either of its extreme positions.

The lateral surfaces of the projection 19 easily turn, as shown in FIG. 2, into the surface forming the bevelled edge 15.

The sealing elements 9 (FIG. 1) and 10 are so mounted in the housing 3 as to be forced against the closing member 4 through the agency of elastic rings 20 made in any presently known material fit for long-term operation in the liquid handled by the pipelines 1 and 2.

The sealing elements 9 and 10 has annular recesses 21 for the elastic rings 20 to accommodate; in order to prevent the rings 20 and the sealing elements 9, 10 against axial displacement away from the closing member 4, annular ridges 22 are provided in the housing 3 on the inner surface thereof, for the elastic rings 20 and the sealing elements 9, 10 to bear against.

An access hole 23 is made in the housing 3 on its wall facing the valve actuator 12, said hole being adapted for installing the sealing elements 9, 10 and elastic rings 20 into the housing or withdrawing these components therefrom without dismantling the valve housing from the pipelines.

The herein-proposed gate valve operates as follows.

In order to establish communication between the pipelines 1 and 2 one must rotate the gate valve handwheel 14 along with the nut 13, with the result that the rod 11 along with closing member 4 moves upward with respect to the sealing rings 9 and 10 forced against the closing member 4 by virtue of elastic deformation of the rings 20.

While the closing member 4 is being moved the passageway 16 (FIG. 3) is formed in between the sealing rings 9 and 10, the housing 3 and the bevelled edge 15 of the bottom edge of the closing member 4, said passageway getting narrower towards the direction of the flow of liquid. Thus, provision of the bevelled edge 15 and the tapered passageway 16 enable a gradual compression of the flow of liquid in the passageway 16 throughout the width thereof, whereby a minimized flow area and minimized hydrodynamic pressure therein are ensured at the exit of the passageway 16. Moreover, formation of cavitation voids occurs outside the closing member 4, this being due to the fact that the flow of liquid is widely expanded just upon leaving the passageway 16, accompanied by raising the hydrodynamic pressure therein and destruction of cavitation voids. Thus, the bevelled edge on the bottom end of the closing member and formation of the passageway 16 enable one to dislodge cavitation off the closing member into the downstream flow of liquid.

When the closing member 4 is lifted into the topmost position the projection 19 restructs the travel of the sealing element 9 caused by elastic deformation of the ring 20 and hydrodynamic effect produced by the flow of liquid.

Once the flow of liquid in the pipelines 1 and 2 has been shut off the closing member 4 moves down to assume its bottommost position; thus, the flow of liquid gets shut off first at the downstream end of the sealing element 10, then at the upstream end of the sealing element 9, this being due to the provision of the bevelled edge 15 and owing to the different length of the lateral surfaces 17 and 18 of the closing member 4. Thus, any possibility of the onset of cavitation is obviated in this case as well, and the process of cavitation is brought outside the closing member towards the direction of the flow of liquid.

What is claimed is:

1. A gate valve comprising, a valve housing defining a flow path therethrough having an inlet and an outlet to allow flow of a liquid therebetween, a gate valve operable to close and open the valve and disposed to extend across said flow path substantially normal to the flow of liquid therethrough, said gate valve having a tapered lower edge extending across a lower portion of a major side face of the gate, said gate decreasing in cross section toward said lower edge and in a direction toward the periphery of said face in a direction toward the direction of flow of said liquid, a projection extending downwardly from said lower edge, and said projection having a width substantially less than the width of said gate across said flow path.

2. A gate valve according to claim 1, in which said major side face having said taper being disposed toward the inlet and thereby toward the direction from which the liquid flows through the valve housing.

3. A gate valve according to claim 2, including sealing element with elastic rings between which the gate valve is disposed.

4. A gate valve comprising, a valve housing defining a flow path for flowing a liquid therethrough, a movable gate valve in said valve housing operable to a position closing said flow path and to a position in which said valve is open and liquid can flow through said flow path; said gate having a major side face having a tapered edge extending across a portion of said major side face of the gate defining a passageway decreasing in cross section in a direction downstream and in a direction toward the periphery of said face with said housing when the valve is partially open, said gate decreasing in cross section toward the periphery of said major side face, said passageway decreasing in cross section toward said edge and in a direction toward the periphery of said face in the direction of flow of liquid through said valve housing, a projection extending from said edge, said projection having a width substantially less than the width of said gate across said flow path, two annular seats between which the gate extends and seats thereon to effect closing of the valve, elastic rings biasing the seats each in a direction for engaging with the gate, and said passageway being effective to raise hydro-dynamic pressure in a zone of said passageway to avoid cavitation in the vicinity of said gate.

* * * * *